3,150,171
PRODUCTION OF AROMATIC CARBOXYLIC
ACIDS FROM ARALKYL HALIDES
Anton Benning, Essen-Heisingen, Ulrich Dolling, Essen, and Otto Grosskinsky, Dortmund-Kirchhorde, Germany, assignors to Firma Bergwerksverband G.m.b.H., Essen, Germany
No Drawing. Filed June 11, 1959, Ser. No. 819,556
Claims priority, application Germany June 16, 1958
3 Claims. (Cl. 260—523)

The present invention relates to the production of aralkyl alcohols and aromatic carboxylic acids, and more particularly to the conversion of aralkyl halides to aralkyl alcohols and the further conversion of the aralkyl alcohols to aromatic acids.

The saponification of aralkyl halides such as chloromethyl toluenes or mono- and bis-chloromethyl xylenes by reaction thereof with water to form the corresponding alcohols according to the following equation:

$$RCH_2Cl + H_2O \rightarrow RCH_2OH + HCl$$

wherein R is an aryl radical could not be carried out on a technical commercial basis. This reaction which is of interest because the aralkyl alcohol which is produced thereby can be quantitatively oxidized to the corresponding aromatic carboxylic acid has been available prior to the present invention only as a laboratory experiment.

Under known conditions the saponification reaction mentioned above proceeds in an entirely unsatisfactory manner and it is for this reason that the reaction has not been suitable for technical application. The aralkyl halides, also referred to herein as haloalkyl compounds and chloroalkyl compounds, cannot be saponified in an acid medium because in such medium large amounts of condensation products of the type of dibenzyl ether are formed. Likewise, saponification in an alkaline medium also occurs with ether formation, and in addition entails the following drawbacks:

The speed of the saponification reaction is too slow, the reaction period lasting, for example, in the case of chloromethyltoluene for at least 6–24 hours. Other chloromethyl compounds necessitate even longer periods of reaction.

Even after 24 hours the saponification is not quantitatively accomplished.

Non-converted starting material causes disturbing effects on the subsequent oxidation. Accordingly a distillation treatment of the saponification mixture is necessary.

A high alkali excess accelerates the saponification speed only to a slight extent, while on the other hand favoring the troublesome ether formation.

A saponification in the presence of at least 20 times by weight of water of the weight of the aralkyl halide gives rise to only slightly useful results. Moreover, this method involves a further disadvantage, since the alcohol must be extracted from the aqueous phase.

In connection with the production of aromatic carboxylic acids from the aralkyl alcohols resulting from the saponification of aralkyl halides it was always necessary prior to the present invention to very carefully separate the aralkyl alcohols from the reaction mixture prior to oxidation thereof to the corresponding aromatic carboxylic acids. This was necessary due to the fact that the reaction mixture containing the aralkyl alcohols also contained many side products which interfered with the oxidation of the aralkyl alcohols to the aromatic carboxylic acids. Such separation not only involved a high expense, further preventing the commercial utilization of the general process, but also was practically a purification of the aralkyl alcohols so that in effect the aralkyl halide could not be considered as the starting product for the production of the corresponding aromatic carboxylic acid.

It is therefore a primary object of the present invention to provide a method of saponifying aralkyl halides to aralkyl alcohols which method results in the production of the aralkyl alcohols in high yield.

It is another object of the present invention to provide a method of reacting aralkyl halides with water in alkaline medium whereby the corresponding aralkyl alcohol is formed in high yield and with a minimum of undesirable side products.

It is yet another object of the present invention to provide a method of converting aralkyl halides to aralkyl alcohols and, without purification of the aralkyl alcohols and separation thereof from the reaction mass, of converting the aralkyl alcohols to the corresponding aromatic carboxylic acids.

Other objects and advantages of the present invention will be apparent from a further reading of the specification and of the appended claims.

With the above objects in view, the present invention mainly comprises the method of producing aralkyl alcohol by reacting an aralkyl halide with water in the presence of an alkali at a temperature of above 120° C., thereby forming the corresponding aralkyl alcohol in high yield.

The reaction is preferably carried out at a pressure above 2 atmospheres, the reaction preferably being carried out in a closed vessel. Since the reaction is generally carried out in a closed vessel the pressure during the reaction generally corresponds to at least the steam pressure. However, the pressure may be higher than steam pressure due to the formation of carbon dioxide if the alkali which is used is an alkali carbonate, and the pressure may increase to 60 atmospheres or even 100 atmospheres. The course of the reaction is not disturbed by higher pressures but neither is it greatly accelerated. Therefore there is no great advantage in using higher pressures and the economy of the process is accordingly better using lower pressures, for example between 2 and 20 atmospheres. In general, in order to protect the apparatus it is advisable to maintain the pressure at a medium pressure of for example about 20 atmospheres by discharging the gases.

The process of the present invention provides the extremely important advantage that the conversion of the aralkyl halide to the aralkyl alcohol is completed in a very short time, generally 20 to 30 minutes and at most about 40 minutes with complete conversion of the starting material, which is quite unexpected. Accordingly, a distillation treatment of the reaction mixture which is obtained is not needed in connection with the further embodiment of the present invention of converting the thus formed aralkyl alcohols to the corresponding aromatic carboxylic acids. In accordance with this embodiment of the present invention this can be done without any need for separation of non-converted starting material prior to the oxidation of the aralkyl alcohol to the aromatic carboxylic acid.

A further advantage of the process of the present invention is that it can be carried out without very large excesses of water. Thus, the reaction according to the present invention can be carried out with as little water as one and a half times by weight of the weight of the aralkyl halide. The maximum amount of water with respect to the amount of the aralkyl halide is only limited by considerations of economy of the process, and thus, for practical purposes, the amount of water should not be greater than ten times the weight of the aralkyl halide. Best results are generally obtained utilizing water in an amount of 2–5 times, and still more preferably 2–4 times the amount of the aralkyl halide. By proceeding in this manner the alcohol portion absorbed by the water remains quite small. Furthermore, the aqueous phase separated from the organic solution can be used several times for further charges, thus additionally reducing the losses of the produced alcohol. The formation of undesired ether also takes place in only extremely slight amounts by proceeding in accordance with the conditions of the present invention, which is probably one of the reasons that the reaction proceeds so well to such completion in such short time.

The process of the present invention can be carried out continuously or discontinuously. It is generally advisable to operate in enameled pressure vessels.

The reaction may be carried out in the presence of any normal alkaline saponification agent and it is to be understood that the term "alkali" as used throughout the specification and claims of this case to refer to the saponification agent is meant to include all of the usual alkaline saponification agents. Thus, the reaction may be carried out utilizing as the alkali an alkali metal hydroxide, carbonate or bicarbonate or an alkaline earth metal oxide, hydroxide or carbonate such as sodium hydroxide, potassium hydroxide, sodium carbonate, sodium bicarbonate, magnesium oxide, magnesium carbonate, calcium carbonate and calcium oxide. The difference in effect among the various saponification agents is extremely insignificant.

The process of the present invention may be carried out with all aralkyl halides such as the chloroalkylation products of following aromatic hydrocarbons:

Benzene, toluene, o-, m- and p-xylene, ethyl-benzene, propyl-benzene, cumene, pseudocumene, mesitylene, durene, isodurene, prehnitene, p-cymene, naphthalene, $\alpha$-methylnaphthalene, $\beta$-methylnaphthalene, acenaphthene, anthracene, phenanthrene, benzylchloride, phenol, cresol, p-anisole and phenyl ether, as well as the halogen derivatives thereof.

The amount of the alkali used in carrying out the reaction should be at least stoichiometric with respect to the saponification reaction, although it is preferred to use a slight excess of about 5%. The amount of the alkali should generally be at least one tenth of the amount of the aralkyl halide and up to equal the weight of the aralkyl halide.

The reaction time for the process of the invention may be shortened rather noticeably by intensive agitation during the reaction, though such agitation is not necessary for the course of the reaction to still proceed much more rapidly than any similar reactions prior to the present invention.

The reaction mixture is preferably heated to 135–140° C. for the saponification, but the temperature may be also increased to 200° C. in order to further shorten the reaction time. Higher temperatures are not recommendable, since then the formation of undesired condensation products would start in larger amounts.

The termination of the saponification may be easily determined by sample taking, the reaction generally being finished after 30 minutes. Chloroalkyl compounds which are easily saponifiable are completely converted into the respective alcohols even after 15 minutes. Thus, in general, the time for this step according to the present invention is 15–40 minutes; it is preferably 20–40 minutes.

The separation of the formed alcohols from the aqueous phase may be accomplished rather easily since the organic phase generally floats upon the aqueous phase as an oil, so that it can be simply discharged from the bottom of the reaction vessel. The mud consisting of alkaline earth oxides is removed together with the water.

The greatest portion of the alcohols formed has a melting point above 40–80° C., however, and crystallizes out immediately when the reaction mixture is cooled. These alcohols can therefore be easily separated from the aqueous phase by sucking-off, filtering-off, etc. It is advisable to thoroughly re-wash with water in order to completely remove all the by-products contained in the aqueous phase, especially the formed halide, such as e.g. NaCl, $CaCl_2$, etc.

It is clear that insoluble alkaline earth oxides are not separated from the saponification product in this case. With regard to the subsequent oxidation to aromatic carboxylic acids in accordance with the preferred embodiment of the invention there is no disadvantage in this. However, it is also possible to bring these alkaline earth oxides into solution by acidifying the entire reaction mixture and thus to separate the alcohol formed from the rest of the products without contamination by alkaline earth compounds.

However, as pointed out above, it is a great advantage of the overall process of the present invention of producing aromatic carboxylic acids from aralkyl halides to be able to directly oxidize the produced aralkyl alcohols without purification and separation thereof from the reaction mixture, but only after removing the aqueous phase from the remainder of the reaction mass. This results in considerable economy in the overall process, including savings in apparatus, material, time, and labor.

For the oxidation stage the saponification product is mixed with 4–20 its weight with 10–60% nitric acid, preferably with 8 times by weight and then heated. Since the use of a strong acid results also in a relatively strong $NO_2$ formation, while on the other hand the reaction time is correspondingly increased by the use of a weaker nitric acid, it is advisable to use an acid of a medium concentration, e.g. 25–45% nitric acid.

If the oxidation takes place under normal pressure the reaction mixture is normally heated up to the boiling point of the reaction mixture, which is 110–130° C. according to the nitric acid concentration but temperatures between 80 and 110° C. are also sufficient. In general the oxidation is completed after 1½ hours, while 30 minutes of reaction are sufficient for alcohols which are easy to oxidize. However, according to the nitric acid concentration and reaction temperature two to three hours may be necessary for this reaction stage.

For further acceleration of the reaction it is possible to carry out the oxidation in a closed vessel, thus increasing the oxidation temperature. As long as the reaction temperature remains below 140° C., only the oxyalkyl group is substantially oxidized to the carboxyl group, however. Thus, only the dimethyl phthalic acid is obtained from the saponification product of the bis-chloromethyl-xylene as demonstrated in Example V. If on the other hand the temperature is increased above 140° C., at most to about 220° C., the alkyl groups which may be present are simultaneously oxidized to carboxyl groups. Accordingly, pyromellitic acid would be obtained instead of dimethyl phthalic acid.

The most favorable temperature range for this oxidation reaction is at 150–180° C. The reaction is completed after 30 minutes up to 4 hours, depending upon the temperature and number of the alkyl and oxy-alkyl groups to be oxidized. According to the free autoclave space the pressure in the autoclave increases to 60 atmospheres and above by the gases formed in the course of the nitric acid oxidation. For protecting of the apparatus it is advisable, however, to keep the pressure at a medium condition, e.g. at 20–30 atmospheres by discharging the liberated gases. The lowest pressure corresponds to the steam pressure of the nitric acid employed and amounts to about 10–20 atmospheres. It is possible to first oxidize the saponification product under conditions which cause the oxidation of only the alcohol group to the carboxyl group and to susbsequently increase the temperature to above 140° C. However, the saponification product can be directly oxidized in the autoclave under such conditions, which also result in the oxidation of the alkyl groups. The oxidation reactions may also be carried out continuously.

The following examples are given to further illustrate the present invention. The scope of the invention is not, however, meant to be limited to the specific details of the examples:

*Example I*

300 parts by weight of pure p-chloromethyltoluene are heated to 120–130° C. for 30 minutes together with 107 parts by weight of calcium carbonate and 1000 parts by weight of water in an enameled stirring autoclave resistant to pressure. After cooling the oily layer is separated and heated to 190° C. for one hour in a stainless steel reactor together with 3500 parts by weight of 20% nitric acid. 330 parts by weight of terephthalic acid with the acid number 674 are obtained from the cooled solution.

*Example II*

300 parts by weight of chloromethyltoluene consisting of 65% of p-chloromethyltoluene and 35% of o-chloromethyltoluene are continuously passed through a tube heated to 125° C. together with 88 parts by weight of calcium hydroxide and 1000 parts by weight of water, the residence time of the mixture amounting to 25 minutes within the tube. After cooling an upper layer is formed from methylbenzylalcohol and a lower layer from the solution of calcium chloride. The oily layer consists of 235 parts by weight of methylbenzylalcohol (o-p-mixture) and 13 parts by weight of dixlylether.

*Example III*

300 parts by weight of chloromethyltoluene containing 65% of p-chloromethyltoluene and 35% of o-chloromethyltoluene are heated to 125° C. for 35 minutes in an enameled stirring autoclave resistant to pressure together with 30 parts by weight of calcium oxide, 20 parts by weight of magnesium oxide and 1200 parts by weight of water. The mixture is allowed to cool, and the saponification product is separated from the aqueous phase and heated to 170° in a stainless steel reactor together with 1800 parts by weight of 32% nitric acid. The terephthalic acid formed is separated from the reaction mixture while still in hot condition and after cooling the precipitated o-phthalic acid is also separated. 205 parts by weight of terephthalic acid are obtained having an acid number of 672 after washing with toluene and 98 parts by weight of o-phthalic acid having a pure melting point.

*Example IV*

A mixture consisting of 203 parts by weight of bis-chloromethylxylene, 57 parts by weight of calcium oxide and 100 parts by weight of water is heated to 125° C. in a stirring autoclave. After cooling the reaction mixture, the crystalline bis-hydroxymethylxylene is sucked off. 142 parts of bis-hydroxymethylxylene (melting point 150° C.) are obtained.

*Example V*

A preheated mixture consisting of 300 parts by weight of bis-chloromethylxylene, 83 parts by weight of calcium hydroxide and 800 parts by weight of water is continuously passed from below through a reaction tube of stainless steel and heated to 125–140° C., the residence time of the mixture amounting to about 30 minutes within the tube. After cooling the reaction mixture, the upper layer consisting of bis-oxymethylxylene is separated and heated to boiling for 2 hours together with 20% nitric acid. The solution upon cooling yields 253 parts by weight of dimethylphthalic acid (acid number 552). After recrystallization the acid number is 573.

*Example VI*

300 parts by weight of monochloromethylmesitylene are heated to 130° C. for 45 minutes in an enameled stirring autoclave together with 37 parts by weight of magnesium oxide. The mono-hydroxymethylmesitylene crystallized out when cooling is sucked off, dried and recrystallized from ligroine. 228 parts by weight of mono-hydroxymethylmesitylene (melting point 88° C.) are obtained.

*Example VII*

A mixture consisting of 309 parts by weight of mono-chloromethyl-m-xylene, 57 parts by weight of calcium oxide and 1000 parts by weight of water is continuously passed through a reaction tube of stainless steel and heated to 135° C., the residence time of the mixture amounting to 30 minutes within the tube. 241 parts by weight of dimethylbenzylalcohol are obtained.

*Example VIII*

300 parts by weight of monochloromethylxylene are heated to 130° C. for half an hour in an enameled agitating autoclave together with 170 parts by weight of sodium bicarbonate and 100 parts by weight of water. The oily dimethylbenzylalcohol is removed from the reaction mixture and heated to boiling for one hour together with 8 times its amount of 35% nitric acid. The dimethyl benzoic acid crystallized out during the cooling is purified by recrystallization from diluted acetic acid. 230 parts by weight of dimethyl benzoic acid with an acid number of 373 are obtained.

*Example IX*

A mixture consisting of 185 parts by weight of p-xylylbromide, 105 parts by weight of potassium bicarbonate, and 400 parts by weight of water is heated to 130° C. for 20 minutes in an enameled stirring autoclave, the pressure being maintained at 20 atmospheres by blowing-off the carbon dioxide. The charge is cooled to 10° C. and the p-methylbenzylalcohol is vigorously sucked-off. 111 parts by weight of p-methylbenzylalcohol (melting point 58° C.) are obtained.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of producing aromatic carboxylic acids from aralkyl chlorides and bromides, comprising the steps of subjecting an aralkyl halide selected from the group consisting of alkyl bromides and chlorides of a compound selected from the group consisting of benzene, toluene, xylenes, ethylbenzene, propylbenzene, cumene, pseudocumene, mesitylene, durene, isodurene, prehnitene, p-cymene, naphthalene, methylnaphthalenes, acenaphthene, anthracene, phenanthrene, phenol, anisole and phenyl ether to reaction in a reaction mass consisting essentially of said aralkyl halide, water and an alkali at a temperature between about 120 and 200° C. and at a pressure above 2 atmospheres, said water being utilized in an amount of 1½ to 10 times the weight of said aralkyl halide for a period of about 15–40 minutes, thereby forming a reaction mass comprising the corresponding aralkyl alcohol and an aqueous phase; separating said aqueous phase from the remainder of the reaction mass including said aralkyl alcohol; and directly subjecting the remainder of said reaction mass to oxidation with 4–20 times the amount of said aralkyl alcohol of nitric acid of 10–60% concentration at a predetermined temperature, said predetermined temperature being between about 80–130° C. at normal pressure and between about 140–220° C. at a superatmospheric pressure of up to about 60 atmospheres, thereby converting said aralkyl alcohol to the corresponding aromatic carboxylic acid.

2. A method of producing aromatic carboxylic acids from aralkyl chlorides and bromides, comprising the steps of subjecting an aralkyl halide selected from the group consisting of alkyl bromides and chlorides of a compound selected from the group consisting of benzene, toluene, xylenes, ethylbenzene, propylbenzene, cumene, pseudocumene, mesitylene, durene, isodurene, prehnitene, p-cymene, naphthalene, methylnaphthalenes, acenaphthene anthracene, phenanthrene, phenol, anisole and phenyl ether to reaction in a reaction mass consisting essentially of said aralkyl halide, water and an alkali at a temperature between about 120 and 200° C. and at a pressure above 2 atmospheres, said water being utilized in an amount of 2 to 5 times the weight of said aralkyl halide for a period of about 20–40 minutes, thereby forming a reaction mass comprising the corresponding aralkyl alcohol and an aqueous phase; separating said aqueous phase from the remainder of the reaction mass including said aralkyl alcohol; and directly subjecting the remainder of said reaction mass to oxidation with 4–20 times the amount of said aralkyl alcohol of nitric acid of 10–60% concentration at a predetermined temperature, said predetermined temperature being between about 80–130° C. at normal pressure and between about 140–220° C. at a superatmospheric pressure of up to about 60 atmospheres, thereby converting said aralkyl alcohol to the corresponding aromatic carboxylic acid.

3. A method of producing aromatic carboxylic acids from aralkyl chlorides and bromides, comprising the steps of subjecting an aralkyl halide selected from the group consisting of alkyl bromides and chlorides of a compound selected from the group consisting of benzene, toluene, xylenes, ethylbenzene, propylbenzene, cumene, pseudocumene, mesitylene, durene, isodurene, prehnitene, p-cymene, naphthalene, methylnaphthalenes, acenaphthene, anthracene, phenanthrene, phenol, anisole and phenyl ether to reaction in a reaction mass consisting essentially of said aralkyl halide, water and an alkali selected from the group consisting of alkali metal oxides, hydroxides, carbonates and bicarbonates, and alkaline earth metal oxides, hydroxides and carbonates in an amount of one tenth to equal the weight of said aralkyl halide at a temperature between about 120 and 200° C. and at a pressure above 2 atmospheres, said water being utilized in an amount of 2 to 5 times the weight of said aralkyl halide for a period of about 20–40 minutes, thereby forming a reaction mass comprising the corresponding aralkyl alcohol and an aqueous phase; separating said aqueous phase from the remainder of the reaction mass including said aralkyl alcohol; and directly subjecting the remainder of said reaction mass to oxidation with 4–20 times the amount of said aralkyl alcohol of nitric acid of 10–60% concentration at a predetermined temperature, said predetermined temperature being between about 80–130° C. at normal pressure and between about 140–220° C. at a superatmospheric pressure of up to about 60 atmospheres, thereby converting said aralkyl alcohol to the corresponding aromatic carboxylic acid.

References Cited in the file of this patent

UNITED STATES PATENTS

| | | |
|---|---|---|
| 1,968,300 | Kyrides | July 31, 1934 |
| 2,185,141 | Britton et al. | Dec. 26, 1939 |
| 2,308,419 | Heitz et al. | Jan. 12, 1943 |
| 2,563,820 | Darragh et al. | Aug. 14, 1951 |
| 2,666,786 | Kulka et al. | Jan. 19, 1954 |
| 2,916,523 | Michalek | Dec. 8, 1959 |
| 2,975,211 | Girard | Mar. 14, 1961 |
| 3,030,427 | Earhart et al. | Apr. 17, 1962 |

FOREIGN PATENTS

| | | |
|---|---|---|
| 655,074 | Great Britain | July 11, 1951 |

OTHER REFERENCES

Rhoad et al.: J.A.C.S., vol. 72, 2216–19 (1950).